UNITED STATES PATENT OFFICE.

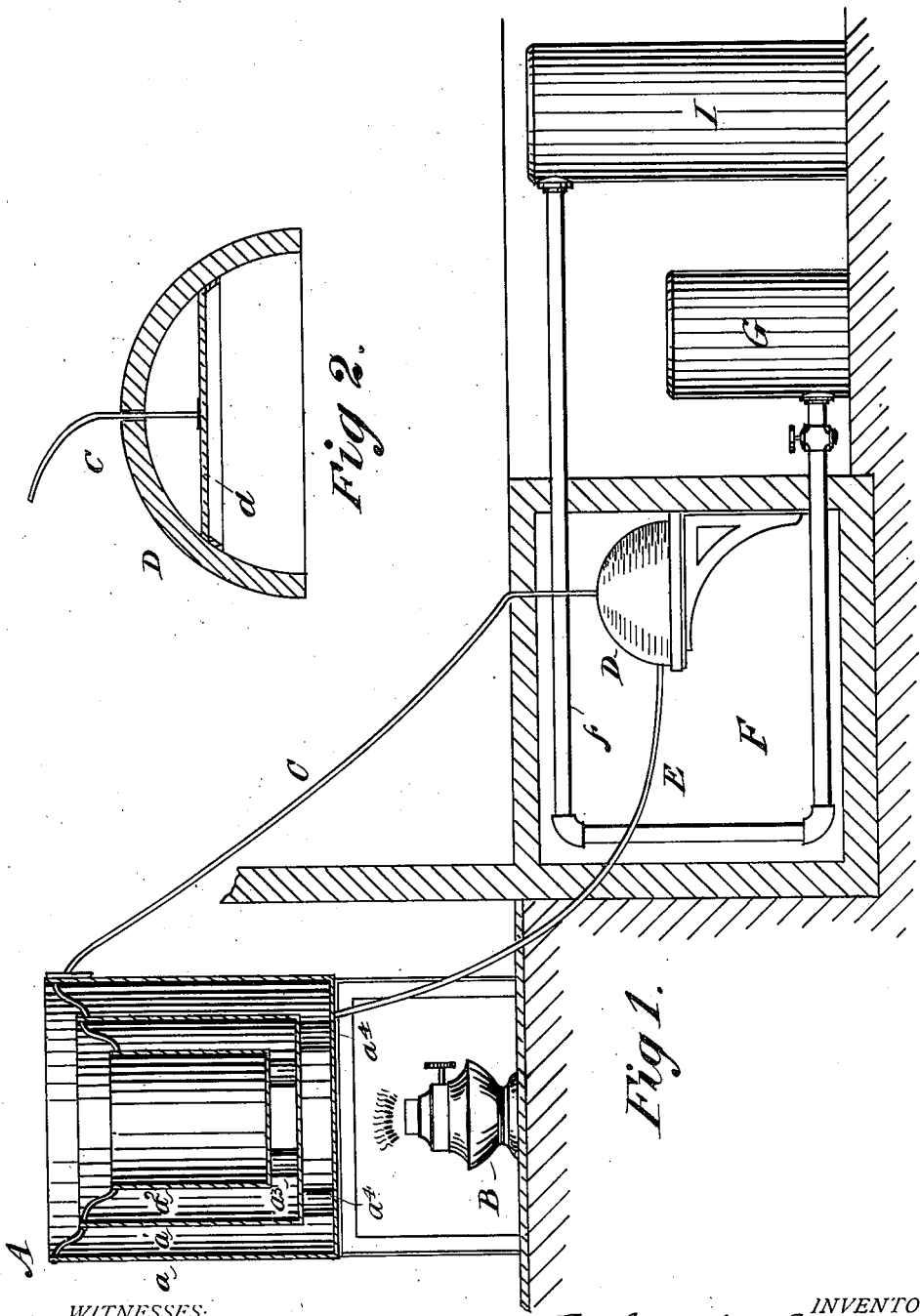

JOHN W. HARRISON, OF PUEBLO, COLORADO.

THERMO-ELECTRIC GENERATOR.

SPECIFICATION forming part of Letters Patent No. 648,492, dated May 1, 1900.

Application filed September 1, 1896. Serial No. 604,520. (No model.)

*To all whom it may concern:*

Be it known that I, JOHN W. HARRISON, a citizen of the United States, residing at Pueblo, in the county of Pueblo and State of Colorado, have invented certain new and useful Improvements in Thermal Electric Generators; and I do hereby declare that the following is a full, clear, and exact description of the invention, reference being had to the accompanying drawings, forming a part of this specification.

My invention relates to that class of electric generators in which a current of electricity is generated by opposing temperatures of heat and cold; and the object of the present invention is to increase the susceptibility of the medium subject to the degrees of cold and to prevent an intermission of the current so excited.

In carrying out my invention and referring to the drawings, A, Figure 1, represents a heat-storing body or accumulator and consists of the separate cylindrical vessels $a$ $a'$ $a^2$, the vessel $a'$ being considerably smaller in diameter than the vessel $a$ and arranged within said vessel, and the vessel $a^2$ being smaller in diameter than the vessel $a'$ and arranged within said vessel. The exterior vessel $a$ is composed of copper, the vessel $a'$ of zinc, and the vessel $a^2$ of tin. These metallic elements, however, may be varied, as in the selection of such metals as are found to give the best results in combination and as contributing to the making of a thermal pile. The upper edges of the vessel $a'$ consist of upwardly-extended outwardly-flaring annular portions of the vessel, which extend to the upper edges of the vessel $a$ and are joined by solder such as is usually applied by an electrical soldering apparatus. The upper edge of the vessel $a^2$ consists of an upwardly-extended annular flaring portion which extends to the upper edge of the vessel $a'$ and is soldered to said vessel as described of the vessel $a'$, the joints of the several metals being thereby electrically connected.

Between the under side of the bottom of vessel $a^2$ and the inner side of the bottom of the vessel $a'$ are a number of copper buttons $a^3$, which establish a connection between the vessel $a'$ and the vessel $a$ at the bottom. Between the inner side of the bottom of the vessel $a$ and the under side of the bottom of vessel $a'$ are copper buttons $a^4$, which electrically connect the said vessels at the bottom. Other metals may be employed for the buttons, such as manganese, zinc, platinum, &c., as the conducting metals are assembled in the body A and the series of metals varied in order.

In the vessel $a^2$ is oil, and in the space between the vessels $a$ and $a'$ and the vessels $a'$ and $a^2$ is also oil. Beneath the respective vessels $a$ $a'$ $a^2$ is a heat-generator or lamp B for raising the temperature of the oil.

The medium for cold consists of a hollow hemispherical shell D, consisting of a compound of tin, zinc, and lead in the proportion of seven parts of tin to one each of zinc and lead. Within the bell-shaped proportions of the shell D is a cold area, the shell being of equal thickness throughout. Upon the inner side of the hemispherical shell D is a diaphragm composed of a thin copper plate connected with the shell. The shell D (seen in Fig. 2 enlarged above the diaphragm) is perforated at the apex, and through said perforation is extended one end of an insulated conducting-wire C, which end is connected rigidly with the copper diaphragm $d$. The other end of the conductor C is connected with the upper end portion of the vessel $a$. To the bottom portion of the vessel $a$ is connected one end of an insulated return conducting-wire E, the other end of which wire is connected with the lower edge portion of the shell D.

To increase the cold surrounding normally the shell D, said shell is placed within a chamber F, in which chamber is a pipe $f$, which is connected at one end with a vessel G, outside of the chamber containing an artificial refrigerating agent, such as liquefied ammonia, and the other end of said pipe is connected with a gas-absorbing vessel I, containing a gas-absorbing agent, by means of which artificial refrigerating agent the cold in the chamber F is reduced in degrees, and in like ratio the cold is imparted to the shell D, thence through diaphragm $d$ to the conductor C, and the potential of the current changed so as to effect a thermal electric current which does not vary in strength, and its energy is positively maintained, the completion of the circuit being through the conducting-wire E.

In the ordinary application of the apparatus the vessels $a\ a'\ a^2$ are charged with heat and the medium or hemispherical shell D with cold sufficient to change the potential in the conductor C and cause an electric current to be generated and flow to the diaphragm $d$, and this current being mild is prolonged and kept constant by the cold area always present in shell D. The loss of the current is readily seen in ordinary thermal generators where the negative and positive consists of separate metallic plates the tension of which is alike affected by the surrounding influences of heat as well as cold.

The obvious uses of the generator consist in the well-known applications of mild currents of electricity to excite the action of molecules in microscopic investigations, the application to nerve centers in which pain is felt, and especially at times where shock from the current is not only undesirable, but dangerous. The current is also of value in the arts, for the deposition of metals, and other well-known uses.

Having fully described my invention, what I now claim as new, and desire to secure by Letters Patent, is—

In a thermal electric generator, a body having a heated area consisting of a series of electrically-connected vessels containing stored heat and a heat-generator, flexible conductors of electricity connected with separate parts of said body, and a shell composed of different metals having a cold area and a diaphragm extending from one inner side portion to the other over the said cold area, and in direct electrical connection with said conductors.

JOHN W. HARRISON.

Witnesses:
S. J. MOYER,
T. A. STODDARD.